(12) United States Patent
Dezonno et al.

(10) Patent No.: US 7,184,540 B2
(45) Date of Patent: Feb. 27, 2007

(54) PERSONALITY BASED MATCHING OF CALLERS TO AGENTS IN A COMMUNICATION SYSTEM

(75) Inventors: Anthony J. Dezonno, Bloomingdale, IL (US); Mark J. Power, Carol Stream, IL (US); Roger A. Sumner, Batavia, IL (US); Carlo Bonifazi, Woodridge, IL (US); Jeffrey D. Hodson, Wheaton, IL (US); Craig R. Shambaugh, Wheaton, IL (US); Mark J. Michelson, Elburn, IL (US); Robert P. Beckstrom, Bolingbrook, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 357 days.

(21) Appl. No.: 10/304,872

(22) Filed: Nov. 26, 2002

(65) Prior Publication Data

US 2004/0101127 A1   May 27, 2004

(51) Int. Cl.
*H04M 3/00*     (2006.01)
(52) U.S. Cl. .................... 379/265.02; 379/265.12; 379/265.13
(58) Field of Classification Search .......... 379/265.01, 379/265.02, 265.13, 265.12, 201.02, 265.05, 379/265.06
See application file for complete search history.

(56) References Cited

U.S. PATENT DOCUMENTS

| | | | |
|---|---|---|---|
| 5,555,179 A | 9/1996 | Koyama et al. | |
| 5,594,791 A * | 1/1997 | Szlam et al. | ........... 379/265.09 |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Macleod Beck et al. | |
| 6,173,053 B1 * | 1/2001 | Bogart et al. | ........... 379/266.01 |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |

(Continued)

*Primary Examiner*—Bing Q. Bui
(74) *Attorney, Agent, or Firm*—Welsh & Katz, Ltd.

(57) ABSTRACT

The method and apparatus improves call transactions in a communication system having an automatic call distribution system. A personality profile of each agent of a plurality of agents in the system is determined. A respective personality profile is one of a plurality of predetermined personality profile types. The determined personality profile type for respective agents are stored as personality profile records in a database. A personality profile of a caller is then determined, the personality profile of the caller being one of the plurality of personality profile types. A priority hierarchy is provided for matching a personality profile types of the caller to personality profile types of the agents. The personality profile type of the caller is then compared to the personality profile type of the agents according to this priority hierarchy. An agent is selected from the plurality of agents based on the comparison of the personality profile types.

44 Claims, 6 Drawing Sheets

U.S. PATENT DOCUMENTS

| | | |
|---|---|---|
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,389,400 B1 * | 5/2002 | Bushey et al. .................. 705/7 |
| 6,393,015 B1 | 5/2002 | Shtivelman |
| 6,522,743 B1 * | 2/2003 | Hurd ..................... 379/266.04 |
| 6,732,156 B2 | 5/2004 | Miloslavsky |
| 6,757,361 B2 * | 6/2004 | Blair et al. ................ 379/67.1 |
| 6,798,876 B1 * | 9/2004 | Bala ...................... 379/265.12 |
| 6,985,576 B1 * | 1/2006 | Huck .................... 379/265.09 |

* cited by examiner

PERSONALITY BASED MATCHING OF CALLERS TO AGENTS IN A COMMUNICATION SYSTEM

FIELD OF THE INVENTION

The field of the invention relates to communication systems and, in particular, to communication systems having automatic call distributors.

BACKGROUND

Automatic call distribution systems are known. Such systems are typically used, for example, within private branch telephone exchanges as a means of distributing telephone calls among a group of agents. While the automatic call distributor may be a separate part of a private branch telephone exchange, often the automatic call distributor is integrated into and is an indistinguishable part of the private branch telephone exchange.

Often an organization disseminates a single telephone number to its customers and to the pubic in general as a means of contacting the organization. As calls are directed to the organization from the public switch telephone network, the automatic call distribution system directs the calls to its agents based upon some type of criteria. For example, where all agents are considered equal, the automatic call distributor may distribute the calls based upon which agent has been idle the longest. The agents that are operatively connected to the automatic call distributor may be live agents, and/or virtual agents. Typically, virtual agents are software routines and algorithms that are operatively connected and/or part of the automatic call distributor.

Automatic call distributors are utilized in communications handling centers, such as telephone call centers, that forward incoming communications, such as telephone calls, for processing by one of several associated call-handling agents. Other communications centers may be used to forward voice-over-internet protocol communications; electronic mail messages; facsimiles or the like, to associated handling agents.

Telephone call centers, for example, are often used to dispatch emergency services, as telemarketing sales centers, as customer service centers, etc. to automatically distribute received calls. Each incoming call may have a number of handling requirements, depending on, for example, the nature of the call, the originating call area, and the language of the call. Agents, on the other hand, each have abilities to process calls having certain handling requirements. Typically, agents are able to process one or more call types. For example, agents are typically trained to process certain call subject matters and certain call languages.

In known telephone call centers, computerized automatic call distributors place incoming telephone calls, of a particular type, requiring defined skills, in queues of like calls. Appropriate agents have skills necessary to process calls in the queues, and are assigned to such queues. Agents are often assigned to multiple queues, reflective of their particular handling skills. Typically, this is done to increase the handling capacity of the center by making improved use of available communications handling resources.

Quite often, agents may handle calls related to one or more subject areas, and possess varied attributes that are relevant to all subject areas they are capable of handling. For example, a telephone call center agent may speak multiple languages, and may therefore be able to process telephone calls relating to a particular subject matter in all these languages. One simple approach used to deal with multiple agent attributes is to create and administer individual queues, each of which takes into account the subject matter and the attributes of the agent. This, however, is administratively very cumbersome.

Other known telephone call centers use agent-skill indicators, associated with agents in order to connect calls. In such centers, a call is connected to an agent having an agent-skill indicator matching that of the call, within a group of agents. Agents, however, are typically only assignable to only one, and typically only a single agent-skill indicator is used to connect the call. Disadvantageously, such call centers do not use agent attributes across different groups. This may lead to an inefficient utilization of call center resources. Moreover, these communications handling centers do not allow for easy administration and re-assignment of agents to queues, while maintaining agent skill-sets.

One concern in designing an automatic call distributor system is ensuring that calls are efficiently routed to an agent, so as to minimize the amount of time that any particular call is placed on hold. One basic technique of minimizing on-hold time is to employ a first-in/first-out call handling technique. The first-in/first-out technique requires that calls be routed to the next available agent in the order in which the calls are received. However, in some automatic call distributor systems the agents are specialized in handling particular types of calls, so the first-in/first-out technique is not appropriate. For example in a product support department of a software facility, agents might be grouped according to specialized expertise, so that a first group is knowledgeable in word processing, a second group is knowledgeable in a database program, and a third group is knowledgeable in a spreadsheet program. Utilizing a first-in/first-out technique in such a situation is inappropriate, because a caller with a question regarding the word processing program may be routed to an agent having specialized knowledge regarding the database program or the spreadsheet program, rather than being routed to an agent with specialized knowledge in the word processing program.

The focus in the management of calls has been upon maximizing availability to customers, so as to achieve an acceptable profit margin in a competitive environment of customer service. Call management approaches that increase revenue may lead to savings for customers.

Most present-day call-distribution algorithms focus on being "fair" to callers and to agents. This fairness is reflected by the standard first-in, first-out call to most-idle-agent assignment algorithm. Skills-based routing improves upon this basic algorithm in that it allows each agent to be slotted into a number of categories based on the agent's skill types and levels.

The primary objective of call-distribution algorithms is to ultimately maximize call center performance. That may involve minimizing cost, maximizing call throughput, and/or maximizing revenue, among others. For example, when a new call arrives, the call should be handled by an agent who either has the ability to produce the most revenue or can handle the call in the shortest amount of time. Also, when an agent becomes available to handle a new call, the agent should handle either the call that has the possibility of generating the most revenue or the call that the agent is most efficient in handling.

Automatic call distribution systems are frequently employed in the field of telemarketing. It is not unusual that during a call transaction between a caller and the agent, the personality of a caller and agent clash. This results in the transaction not being as efficient as possible, and may result in a loss of a sale. It also frustrates the caller and reduces caller satisfaction. A crucial part of communication in telemarketing is ensuring that both parties are "on the same wave length." It is thus a drawback of prior art systems that calls are not routed to agents based on personality types that match a personality type of a caller. This leads to less inefficient transactions. It may also result in lower customer satisfaction due to the caller not "liking" the agent who is handling the call. The reduced satisfaction of the call experience leads to lower sales of products and loss of cross-selling opportunities.

SUMMARY

One embodiment is a method for improving transactions in an automatic call distribution system. In a first step, a personality profile of each agent of a plurality of agents in the system is determined. A respective personality profile is one of a plurality of predetermined personality profile types. The determined personality profile type for respective agents are stored as personality profile records in a database. A personality profile of a caller is then determined, the personality profile of the caller being one of the plurality of personality profile types. A priority hierarchy is provided for matching a personality profile types of the caller to personality profile types of the agents. The personality profile type of the caller is then compared to the personality profile type of the agents in the database according to this priority hierarchy. An agent is selected from the plurality of agents based on the comparison of the personality profile types. Communication is then established between the caller and the selected agent. In another further embodiment, the personality profiles are classified as at least one of the following personality profile types: "Analytical type, detailed oriented type, relationship/emotional type, and futuristic/visionary type." Also, in yet a further embodiment, the priority hierarchy for matching of the caller personality profile type to the agent personality profile type is as follows: in a first priority match, analytical type to analytical type, detailed oriented type to detailed oriented type, relationship/emotional type to relationship/emotional type, or futuristic/visionary type to futuristic/visionary type; in a second priority, match analytical type to detailed oriented type or relationship/emotional type to or futuristic/visionary type; in a third priority, match analytical type to futuristic/visionary type or detailed oriented type to relationship/emotional; and in a fourth priority, match analytical type to relationship/emotional type or detailed oriented type to futuristic/visionary type.

In another embodiment, the apparatus improves transactions in an automatic call distribution system. The system has a plurality of agents and a predetermined plurality of personality profile types. A first profile determination module determines a personality profile of each agent of the plurality of agents. A respective personality profile may be one of a plurality of personality profile types. This system also may have a database in which is stored the determined personality profile types for respective agents as personality profile records in the database. A second profile determination module determines a personality profile of a caller, the personality profile of the caller being one of the plurality of personality profile types. A proprietary module outputs a priority hierarchy for matches of personality profile type of a caller to personality profile types of the agents. A comparator compares the personality profile type of the caller and the personality profile types of the agents in the database according to their priority hierarchy. A selector receives the output of the comparator and a response thereto selects an agent from the plurality of agents based on the comparison of personality profile types. A communication module then establishes communication between the caller and the selected agent.

BRIEF DESCRIPTION OF THE DRAWINGS

The features of the present invention, which are believed to be novel, are set forth with particularity in the appended claims. The invention, together with further advantages, may best be understood by reference to the following description taken in conjunction with the accompanying drawings and several figures of like references numerals identify like elements and in which:

DETAILED DESCRIPTION

Figure 1:
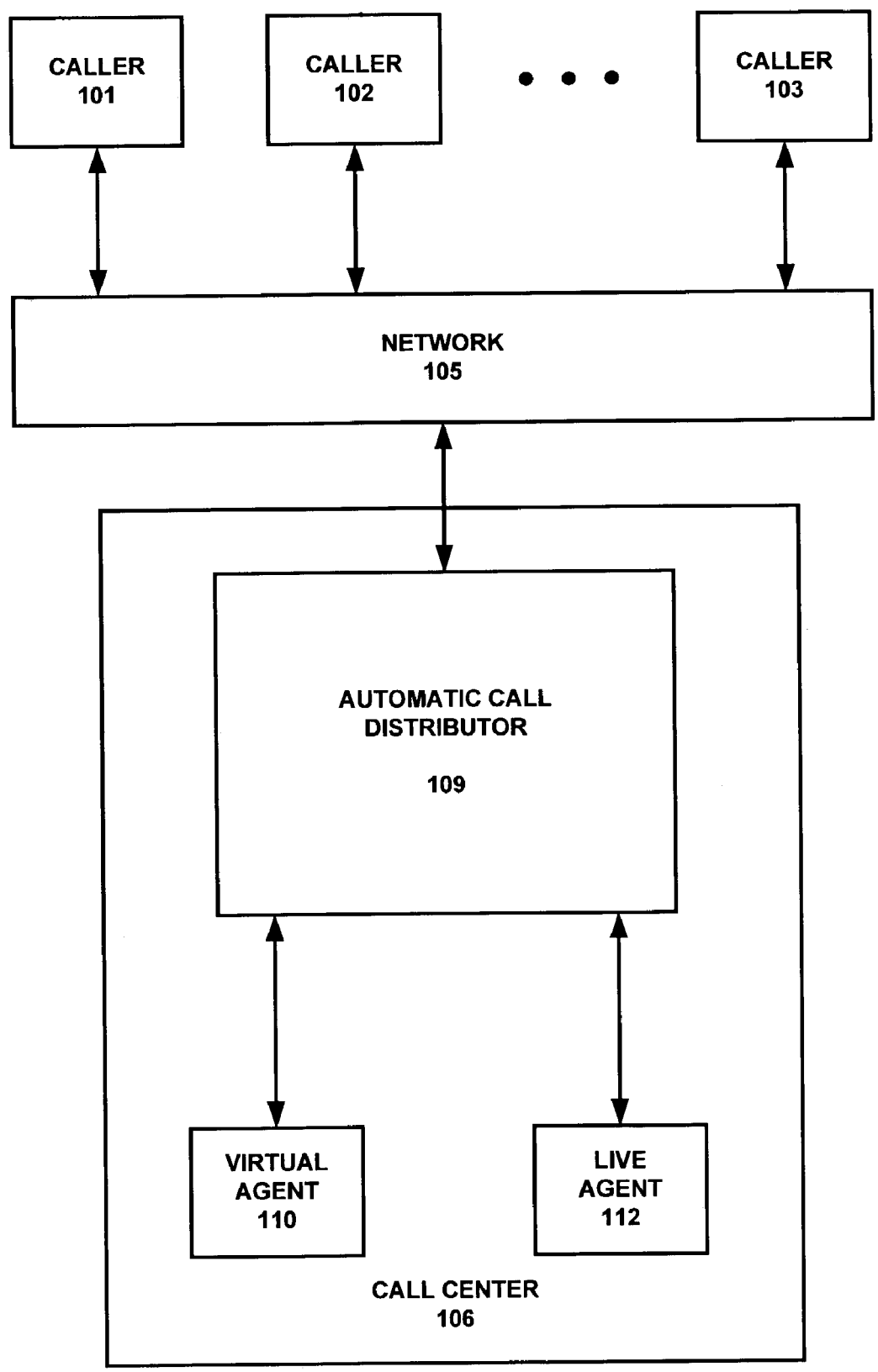
FIG. 1 is a general block diagram of a communication system for use with one embodiment of the method and apparatus.

FIG. 1 is a block diagram of a telephone system having an automatic call distributor 109 that is part of call center 106. Calls may be connected between callers 101, 102, 103 via network 105 to the automatic call distributor 109. The automatic call distributor 109 may distribute the calls to telemarketers or agents, such as virtual agent 110, or live agent 112. The network 105 may be any appropriate communication system network such as a public switch telephone network, cellular telephone network, satellite network, land mobile radio network, the Internet, etc. Similarly, the automatic call distributor 109 may be a stand-alone unit, or may be integrated in a host computer, etc. Embodiments of the method may be implemented under any of number of different formats. For example, where implemented in connection with a public switch telephone network, a satellite network, a cellular or land mobile radio network, the method and apparatus would operate within a host computer associated with the automatic call distributor and may receive voice information (such as pulse code modulation data) from a switched circuit connection which carries a voice between the callers 101, 102, 103 and the agents 110, 112.

Where the method is implemented in connection with the Internet, the method may operate from within a server. Voice information may be carried between the agents 110, 112 and callers 101, 102, 103 using packets.

As shown in FIG. 1, a caller, such as caller 101, may place a call to the call center 106. The caller 101 typically uses a station set that may be embodied as a conventional telephone, videophone or personal computer configured with appropriate telephony software and Internet connectivity. The call is routed via the telephone network 105 to the call center 100, in a conventional manner. The call is preferably routed within the call center 100 to an automatic call distributor 109. The automatic call distributor 109 may comprise conventional hardware and software, as modified herein to carry out the functions and operations of the method.

Generally, the automatic call distributor 109 is part of a switching system designed to receive calls destined for call center 100, and queue them when an appropriate agent is not available. In addition, the automatic call distributor 109 distributes calls to agents or specific groups of agents according to a prearranged scheme.

The telephone network 105, as used herein, includes the combination of local and long distance wire or wireless facilities and switches known as the public switched telephone network, as well as cellular network systems and the telephony feature of the Internet. The telephone network 105 is utilized to complete calls between (i) a caller at a station set, such as callers 101, 102, 103, and the call center 100; (ii) a caller on hold and a third party; and (iii) a caller on hold and a shared-revenue telephone service, such as a 900 or 976 service, provided by content provider. As is well known, shared-revenue telephone services deliver a particular service over the telephone and subsequently bill the caller. The telephone number from which a call is made typically identifies the caller. A subsequent bill is then included as part of the caller's regular telephone bill.

The Internet network, as used herein, includes the World Wide Web (the "Web") and other systems for storing and retrieving information using the Internet. To view a web site, the user communicates an electronic Web address, referred to as a Uniform Resource Locator ("URL"), associated with the web site. It is noted that if the caller accesses the call center 100 from a conventional telephone, the textual portions of a premium web site may be converted to speech for presentation to the caller.

The present method and apparatus match physiological personality profile between agents and inbound callers. Any number of tests, such as Briggs and Minnesota, can be given to an agent to determine which of four, for example, basis personality profiles is the closest match to the agent. Caller personality profiles can be gathered from a variety of methods, such using the personality type of an agent where the caller has had the highest transaction success (no hypothesis of a matching profile existing between the agent and the caller), answers to IVR menu choices, past purchases or calling history, customer survey responses, etc. It is to be understood that numerous tests and procedures are known in the art for determining personality profiles of individuals. Also there are a variety of criteria that can be used for matching different types of personality profiles for achieving desired results.

Figure 2:
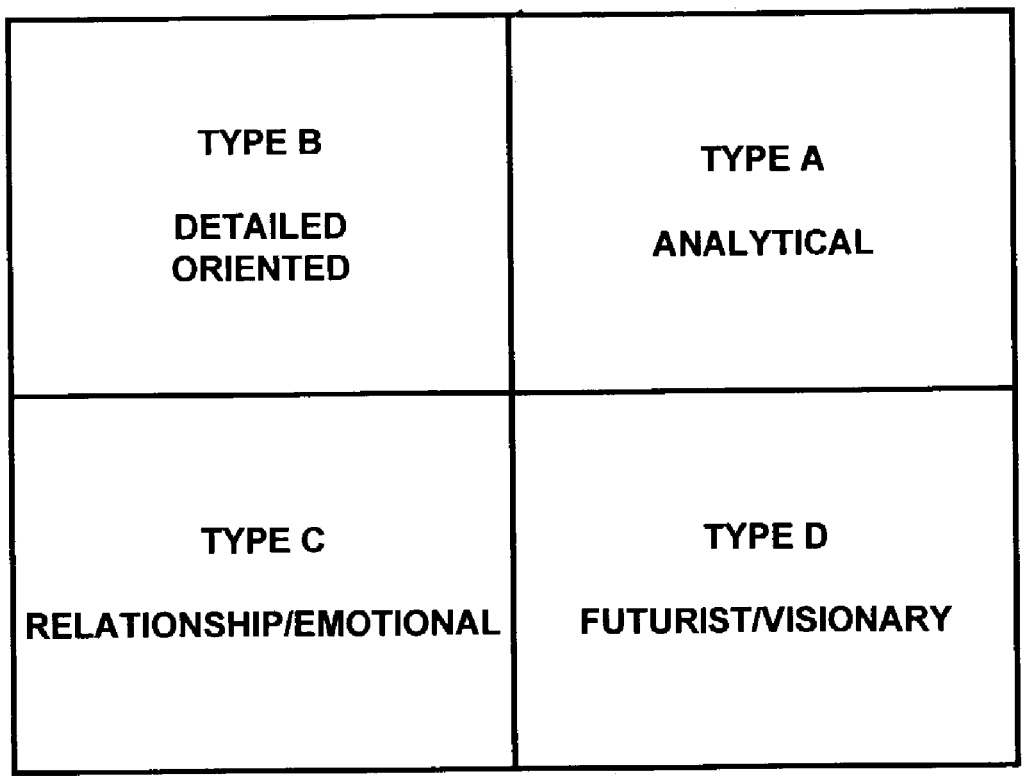
FIG. 2 is a diagram depicting one example of different personality profile types for improving transactions in an automatic call distribution system.

FIG. 2 depicts four types of personality profiles. A Type A is referred to as "analytical." A Type B is referred to as "detailed oriented." A Type C is referred to as "relationship/emotional." Finally, a Type D is referred to as "futuristic/visionary." In one preferred embodiment, the highest priority of matching is to match A to A, B to B, C to C, and D to D. Thus, if a caller were determined to be of an analytical type, then those agents having personality profiles that are analytical would be matched to this caller. If it is not possible to perform the matches according to the first priority, then according to a second priority, A is matched to B, and C to matched to D. Thus, if the caller is analytical, and there is no agent available that has an analytical personality profile, the caller would then be matched to a detailed oriented agent. If this were not possible, then as a third priority, the matching would be A to D and B to C. In the example of the caller with an analytical personality profile, he would be matched to an agent having a futuristic/visionary personality profile. Finally, as the last resort, a fourth priority would match A to C and B to D. Although such matching may be undesirable, the fourth priority only occurs when there is no other option. Thus, in the fourth priority, A is matched to C and B is matched to D. That is the caller who has the analytical personality profile would be matched to an agent having a relationship/emotional profile.

In the real world, many people have multiple overlaps into different regions of these personality profile types. However, with appropriate testing, it can be determined what is the dominant personality profile type as compared to the other personality profile types that a caller has. This dominant personality profile type may then be used for selecting the agent.

Figure 3:
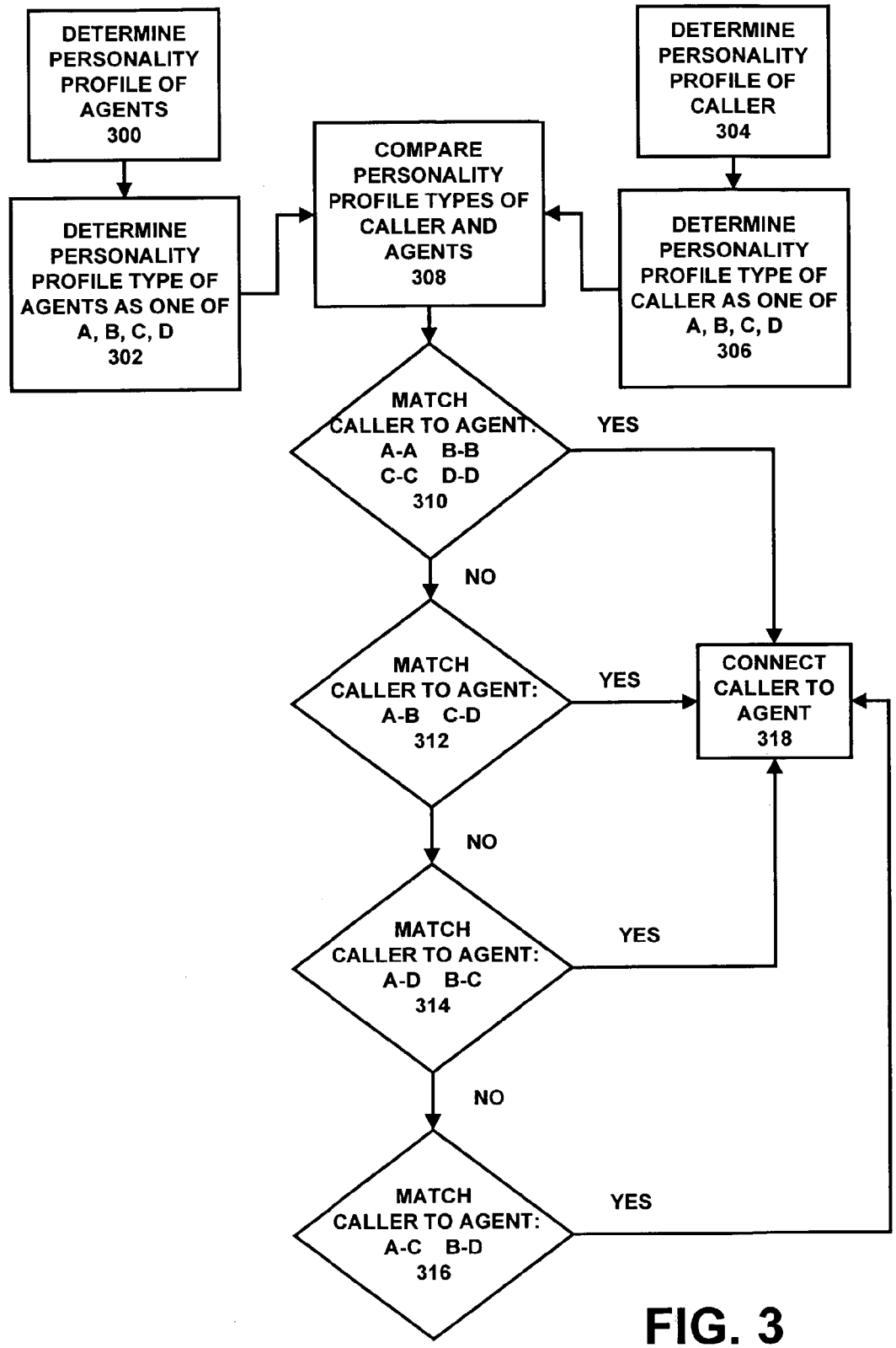
FIG. 3 is a flow diagram for one embodiment of the method for improving transactions in an automatic call distribution system.

FIG. 3 depicts a flow diagram of one embodiment of the method. In this embodiment, personality profiles of agents are first determined in a step 300. Thereafter, in step 302, the personality profiles are classified according to one of four different types for each of the agents. When a call is received from a caller, the personality type of the caller is determined in step 304. In step 306, this personality type of the caller is then classified as one of the four personality types in this embodiment. The personality types of the caller and the agents are then compared in step 308. If the caller can be matched to an agent of the same personality type in step 310, then the caller is connected to that agent in step 318. If this is not possible, then an attempt is made to match the caller to the agent according to the second priority in step 312. If this is further not possible, then in step 314 in a third priority, another an attempt is made to match the caller to an agent. Finally, if this is not possible, then in a fourth priority, the caller is matched to an agent as determined in step 316.

Figure 4:
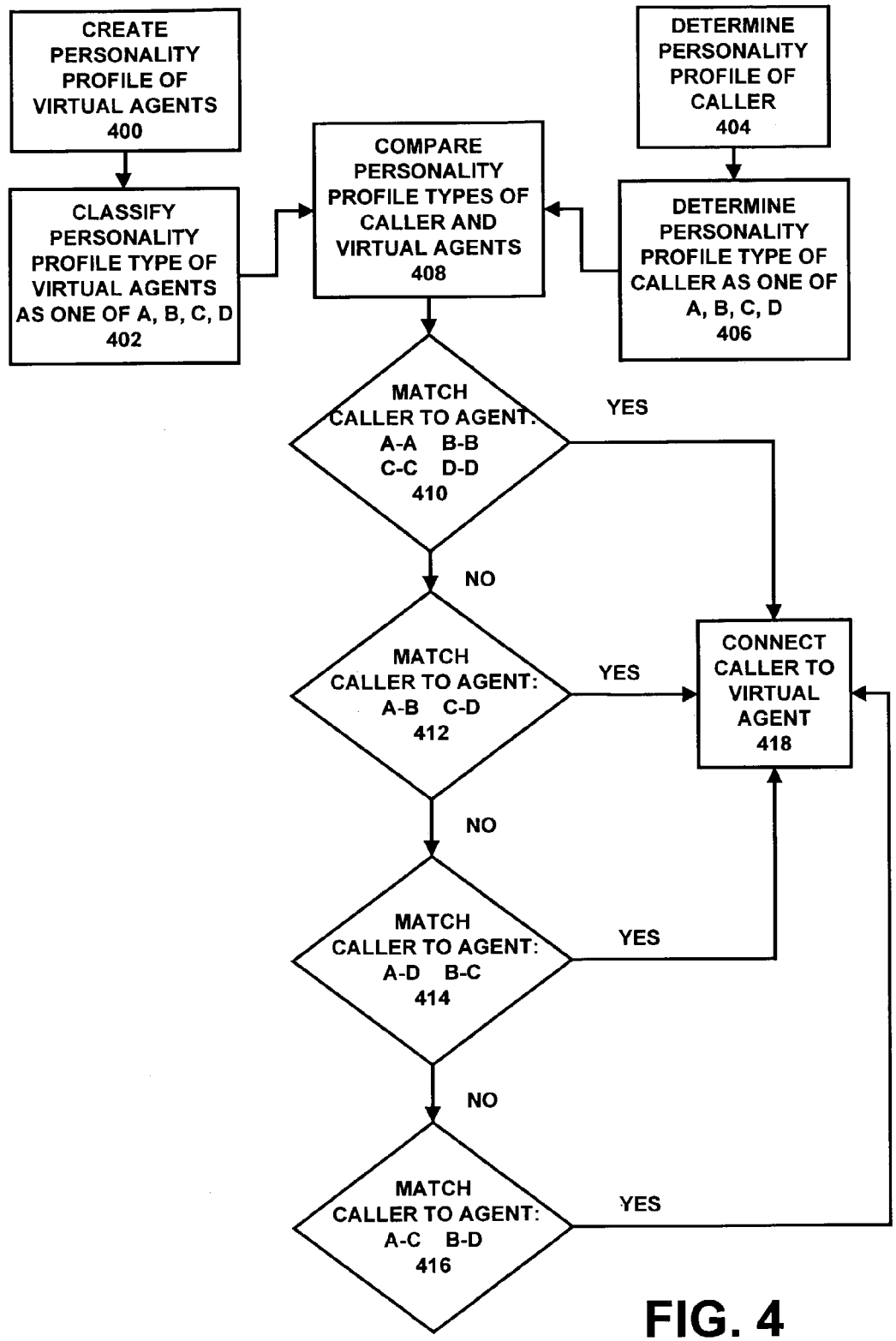
FIG. 4 is a flow diagram of another embodiment for improving transactions in an automatic call distribution system.

The method is useful for routing transactions of people. However, the method may also be utilized in an embodiment for matching people to machines or software implementations that is virtual agents. In such an embodiment, machines are assigned personalities just as the personality profiles were determined for agents in the previous example. With regard to machines, software is utilized to actually create the different personality types. As depicted in FIG. 4, a first step of this embodiment of the method involves creating personality profiles of virtual agents 400 (machines). These different personality profiles are then classified according to profile types into in this example a one of the four types A, B, C, and D. Then when a caller is connected to the system, the personality profile of the caller is determined in step 404 and classified as one of the types A, B, C, and D in step 406. The personality types of the caller and virtual agents are compared in step 408 and matches have an available virtual agent to the caller based on the personality types occurs in steps 410, 412, 414, and 416 according to the priority hierarchy. Once a match is established, then the caller is connected to that virtual agent in step 418.

Figure 5:
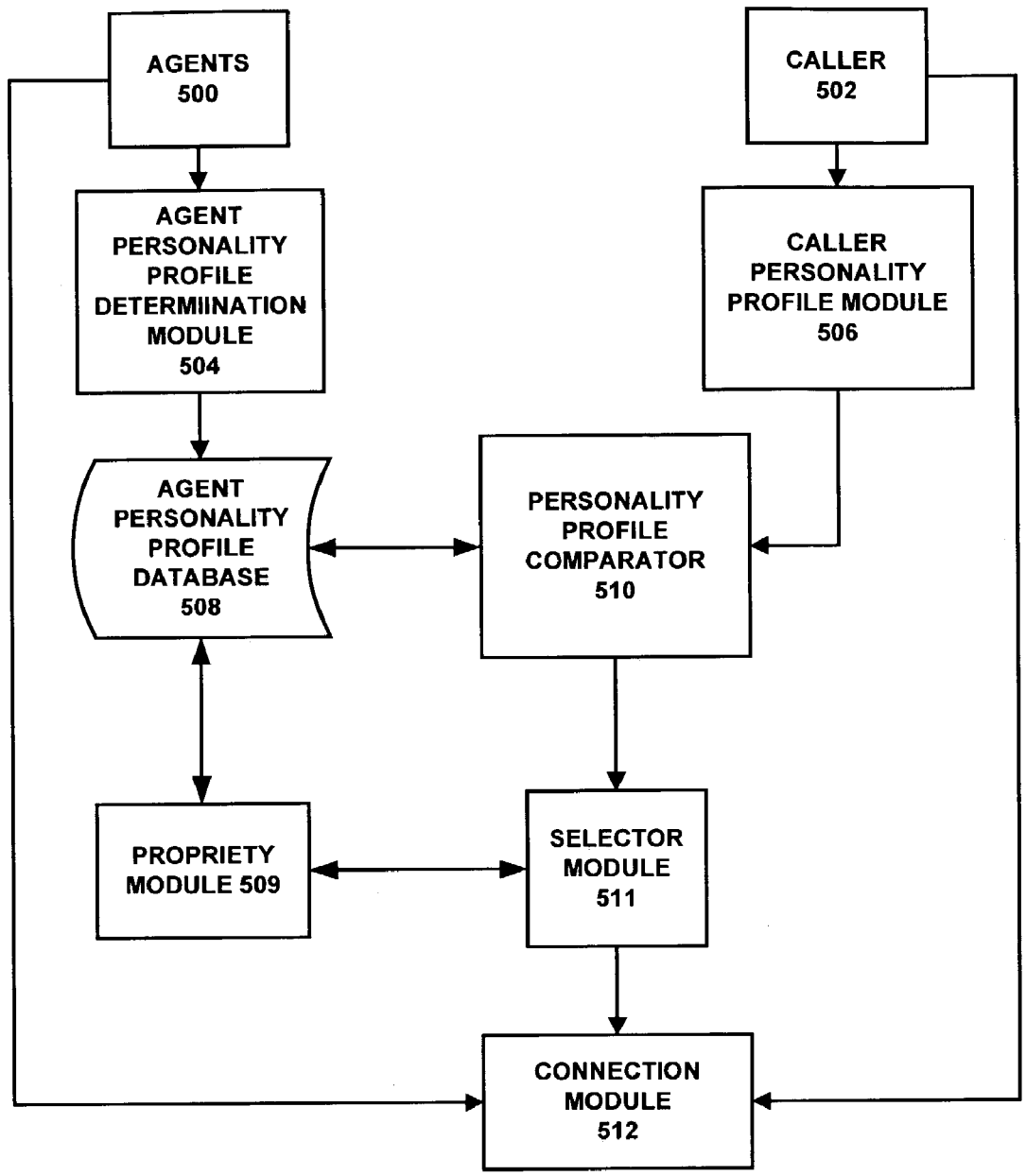
FIG. 5 is a block diagram depicting an implementation for improving transactions in an automatic call distribution system.

FIG. 5 is a blocked diagram depicting an embodiment. Personality profiles of agents 500 are determined by the agent personality profile determination module 504 and stored in the agent personality profile database 508. The personality profile types for respective agents of the plurality of agents are stored in the database 508 as personality profile records. When a caller 502 is connected to the system, a caller personality profile determination module 506 determines the personality profile of the caller 502. The personality profile of the caller 502 and the personality profile records from the database 508 are compared in a personality profile comparator 510. The output of the comparator is provided to a selector module 511. The selector module 511 selects an agent from the plurality of agents based on the comparison of profile types using the priority hierarchy as determined by the priority module 509. In response to a selected module 511, the connection module 512 establishes communication between the caller 502 and the selected agent of the agents 500.

The caller personality profile determination module 506 determines the personality profile of the caller by using at least one of the following; previous transactions success between the caller and a predetermined agent, caller's answers to menu choices, past purchase history, past calling history, caller's survey responses, etc. In one embodiment, the personality profile of a respective agent of the plurality of agents is classified as at least one on the following personality profiles types: analytical type, detailed oriented type, relationship/emotional type, and futuristic/visionary type.

Figure 6:
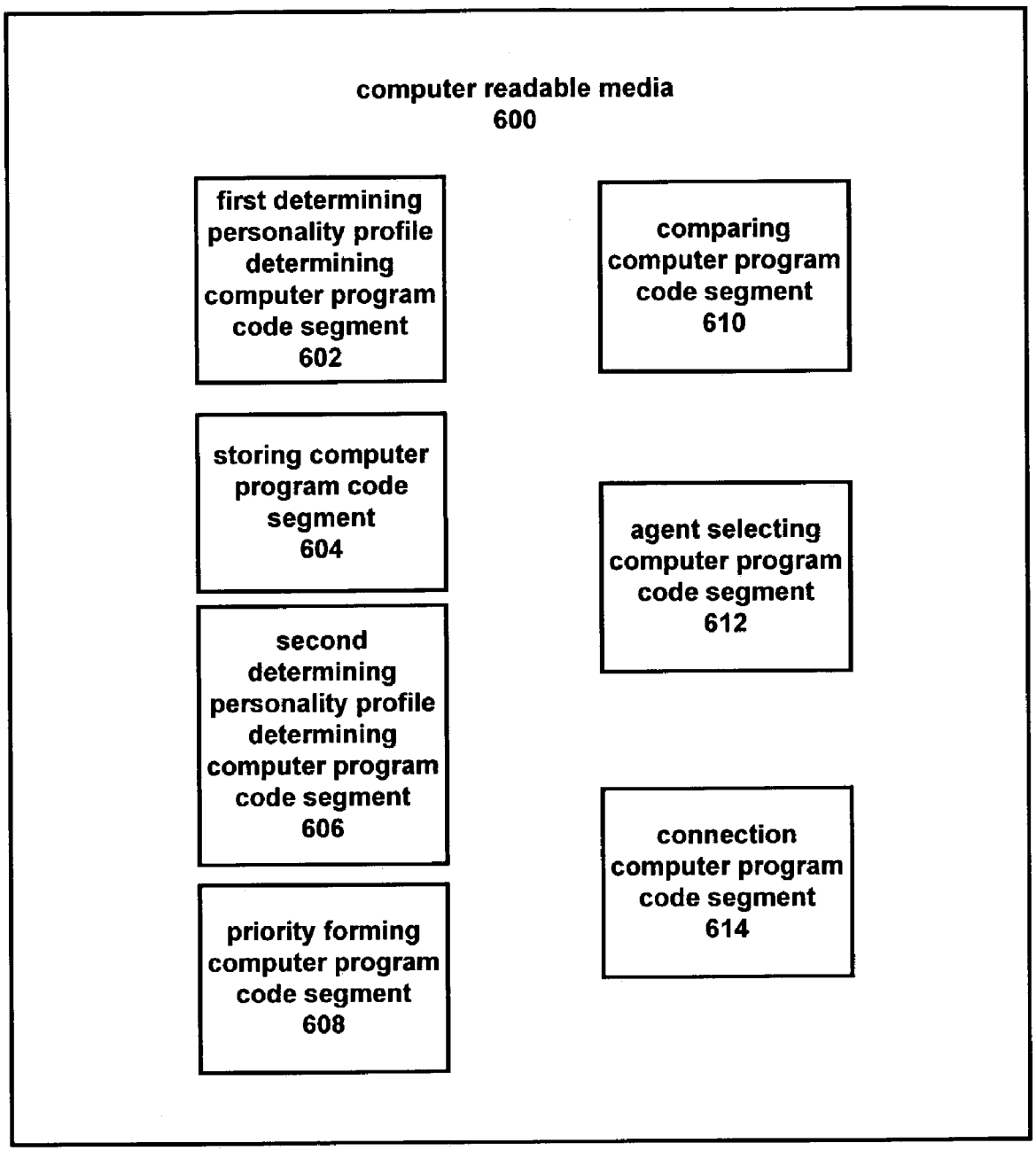
FIG. 6 depicts a computer readable media containing code segments that embody one embodiment for improving transactions in an automatic call distribution system.

FIG. 6 depicts a computer readable media 600, which has code segments. A first determining personality profile determining computer program code segment 602 determines the personality profile of each agent of a plurality of agents. The storing computer program code segment 604 stores the determined personality profile types for respective agents as personality profile records in a database. The second determining personality profile determining computer program code segment 606 determines the personality profile of a caller. The priority forming computer program code segment 608 forms a priority hierarchy for matching personality profile types of the callers to personality profile types of the agents. The comparing computer program code segment 610 compares the personality profile type of the caller to the personality profile types of the agents, according to the priority hierarchy. The agent selecting computer program segment 612 selects an agent from the plurality of agents based on the comparison of personality profile types. The connection computer program code segment 614 establishes communication between the caller and selected agent.

It is an advantage that aligning the personality profiles of a caller and the agent reduces caller transaction problems. This overcomes many drawbacks in the prior art where the personalities of the callers and agents were not taken into consideration when an agent was selected for a particular caller.

The invention is not limited to the particular details of the apparatus and method depicted, and other modification applications are contemplated. Certain other changes may be made in the above-described apparatus and method without departing from the true spirit and scope of the invention herein involved. For example, the present invention can be equally utilized for live agents or virtual agents (software encoded representations of agents). Furthermore, different types of testing for determining the personality types of agents and callers can be utilized with the present invention, and different types of hierarchies with different numbers of personality profile types can be utilized with the present invention. Also for example, although the invention is depicted in the environment of an automatic call distributor, the method and apparatus of the present invention can be utilized in other types of communication systems. It is intended, therefore, that the subject matter in the above depiction shall be interpreted as illustrative and not illuminating sense.

What is claimed is:

1. A method for improving transactions in a communication system, comprising the steps of:

determining a personality profile at least two agents and classifying at least two agents as at least one of the following personality profile types: analytical type, detailed oriented type, relationship/emotional type, and futuristic/visionary type;

determining a personality profile of a caller to classify the caller as at least one of the personality profile types; and connecting the caller to one of the at least two agents based on the respective personality profiles types of the caller and the agents.

2. The method according to claim 1, wherein the caller is an inbound caller to the communication system, the personality profile of the caller being determined by at least one of previous transaction success between the caller and a predetermined agent, caller answers to menu choices, past purchase history, past calling history, caller survey responses.

3. The method according to claim 1, wherein a respective personality profile of the at least two agents is determined from predetermined testing of the at least two agents.

4. The method according to claim 1, wherein the communication system comprises at least two machine based virtual agents each assigned at least one personality profile type: and further comprising connecting the caller to a virtual agent based upon the personality type of the caller and the virtual agents.

5. The method according to claim 4, wherein the virtual agent personality profile types are created utilizing software.

6. The method according to claim 5, wherein the connecting step comprises matching of the caller personality profile type to the agent personality profile type with a priority hierarchy as follows:

first priority, match analytical type to analytical type, detailed oriented type to detailed oriented type, relationship/emotional type to relationship/emotional type, or futuristic/visionary type to futuristic/visionary type;

second priority, match analytical type to detailed oriented type, or relationship/emotional type to futuristic/visionary type;

third priority, match analytical type to futuristic/visionary type, or detailed oriented type to relationship/emotional type;

fourth priority, match analytical type to relationship/emotional type, or detailed oriented type to futuristic/visionary type.

7. A method for improving transactions in an automatic call distribution system, comprising the steps of:

determining a personality profile of each agent of a plurality of agents;

storing the determined personality profiles for respective agents of the plurality of agents as personality profile records in a database;

determining a personality profile of a caller;

assigning a personality profile to respective machine based virtual agents of a plurality of machine based virtual agents;

comparing the personality profile of the caller to personality profiles in the personality profile records of the agents in the database and the personality profiles of the virtual agents;

selecting at least one of an agent from the plurality of agents and a virtual agent of the plurality of virtual agents based on the comparison of personality profiles; and establishing communication between the caller and the selected agents and virtual agents.

8. The method according to claim 7, wherein the caller is an inbound caller to the automatic call distribution system, the personality profile of the caller being determined by at least one of previous transaction success between the caller and a predetermined agent, caller answers to menu choices, past purchase history, past calling history, caller survey responses.

9. The method according to claim 7, wherein a respective personality profile of each of agents is determined from predetermined testing of the agents.

10. The method according to claim 7, wherein a personality profile of a respective agent of the plurality of agents is classified as at least one of the following personality profile types: analytical type, detailed oriented type, relationship/emotional type, and futuristic/visionary type.

11. The method according to claim 10, wherein connection of the caller to an agent is determined by matching the personality profile type of the caller to the personality profile type of the agent.

12. The method according to claim 11, wherein the matching of the caller personality profile type to the agent personality profile type has a priority hierarchy as follows:
first priority, match analytical type to analytical type, detailed oriented type to detailed oriented type, relationship/emotional type to relationship/emotional type, or futuristic/visionary type to futuristic/visionary type;
second priority, match analytical type to detailed oriented type, or relationship/emotional type to futuristic/visionary type;
third priority, match analytical type to futuristic/visionary type, or detailed oriented type to relationship/emotional type;
fourth priority, match analytical type to relationship/emotional type, or detailed oriented type to futuristic/visionary type.

13. A method for improving transactions in an automatic call distribution system, comprising the steps of:
determining a personality profile of each agent of a plurality of agents, a respective personality profile being at least one of the following plurality of personality profile types: analytical type, detailed oriented type, relationship/emotional type, and futuristic/visionary type;
storing the determined personality profile types for respective agents of the plurality of agents as personality profile records in a database;
determining a personality profile of a caller, the personality profile of the caller being one of the plurality of personality profile types;
providing a priority hierarchy for matches of personality profile type of the caller to personality profile types of the agents;
comparing the personality profile type of the caller to the personality profile types of the agents in the database according to the priority hierarchy;
selecting an agent from the plurality of agents based on the comparison of personality profile types; and
establishing communication between the caller and the selected agent.

14. The method according to claim 13, wherein the caller is an inbound caller to the automatic call distribution system, the personality profile of the, caller being determined by at least one of previous transaction success between the caller and a predetermined agent, caller answers to menu choices, past purchase history, past calling history, caller survey responses.

15. The method according to claim 13, wherein a respective personality profile of the agents is determined from predetermined testing of the agents.

16. The method according to claim 13, wherein the automatic call distributor comprises a plurality of machine based virtual agents classified as at least one of the following personality profile types: analytical type, detailed oriented type, relationship/emotional type, and futuristic/visionary type, and further comprising selectively connecting the caller to a respective one of the plurality of virtual agents.

17. The method according to claim 16, wherein connection of the caller to a virtual agent is determined by matching the personality profile type of the caller to the personality profile type of the virtual agent.

18. The method according to claim 17, wherein the priority hierarchy for matching of the caller personality profile type to the agent personality profile type is as follows:
first priority, match analytical type to analytical type, detailed oriented type to detailed oriented type, relationship/emotional type to relationship/emotional type, or futuristic/visionary type to futuristic/visionary type;
second priority, match analytical type to detailed oriented type, or relationship/emotional type to futuristic/visionary type;
third priority, match analytical type to futuristic/visionary type, or detailed oriented type to relationship/emotional type;
fourth priority, match analytical type to relationship/emotional type, or detailed oriented type to futuristic/visionary type.

19. A computer program product embedded in a computer readable medium for use in an automatic call distribution system, comprising:
a computer readable media containing code segments comprising:
a first personality profile determining computer program code segment that determines personality profiles of at least two agents;
a second personality profile determining computer program code segment that determines a personality profile of a caller;
a third personality profile determining computer program code seament that determines a personality profile for at least two machine based virtual agents; and
a connection computer program code segment that connects the caller to one of the at least two agents and the at least two virtual agents based on the personality profiles of the caller, the virtual agents, and the agents.

20. The computer program product according to claim 19, wherein a personality profile of a respective agent of the at least two agents is classified as at least one of the following personality profile types: analytical type, detailed oriented type, relationship/emotional type, and futuristic/visionary type.

21. The computer program product according to claim 20, wherein connection of the caller to an agent is determined by matching the personality profile type of the caller to the personality profile type of the agent.

22. The computer program product according to claim 21, wherein the matching of the caller personality profile type to the agent personality profile type has a priority hierarchy as follows:
first priority, match analytical type to analytical type, detailed oriented type to detailed oriented type, relationship/emotional type to relationship/emotional type, or futuristic/visionary type to futuristic/visionary type;

second priority, match analytical type to detailed oriented type, or relationship/emotional type to futuristic/visionary type;

third priority, match analytical type to futuristic/visionary type, or detailed oriented type to relationship/emotional type;

fourth priority, match analytical type to relationship/emotional type, or detailed oriented type to futuristic/visionary type.

23. A computer program product embedded in a computer readable medium for use in an automatic call distribution system, comprising:

a computer readable media containing code segments comprising:

a first determining personality profile determining computer program code segment that determines a personality profile of each agent of a plurality of agents, a respective personality profile being at least one of a the following plurality of personality profile types: analytical type, detailed oriented type, relationship/emotional type, and futuristic/visionary type;

a storing computer program code segment that stores the determined personality profile types for respective agents of the plurality of agents as personality profile records in a database;

a second determining personality profile determining computer program code segment that determines a personality profile of a caller, the personality profile of the caller being one of the plurality of personality profile types;

a priority forming computer program code segment that forms a priority hierarchy for matches of personality profile type of the caller to personality profile types of the agents;

a comparing computer program code segment that compares the personality profile type of the caller to the personality profile types of the agents in the database according to the priority hierarchy;

an agent selecting computer program code segment that selects an agent from the plurality of agents based on the comparison of personality profile types; and a connection computer program code segment that establishes communication between the caller and the selected agent.

24. The computer program product according to claim 23, wherein the automatic call distributor comprises at least two machine based virtual agents is classified as at least one of the following personality profile types: analytical type, detailed oriented type, relationship/emotional type, and futuristic/visionary type, and further comprising computer program code that selectively connects the caller and a selected virtual agent.

25. The computer program product according to claim 24, wherein connection of the caller to a virtual agent is determined by matching the personality profile type of the caller to the personality profile type of the virtual agent.

26. The computer program product according to claim 25, wherein the matching of the caller personality profile type to the agent personality profile type has a priority hierarchy as follows:

first priority, match analytical type to analytical type, detailed oriented type to detailed oriented type, relationship/emotional type to relationship/emotional type, or futuristic/visionary type to futuristic/visionary type;

second priority, match analytical type to detailed oriented type, or relationship/emotional type to futuristic/visionary type;

third priority, match analytical type to futuristic/visionary type, or detailed oriented type to relationship/emotional type;

fourth priority, match analytical type to relationship/emotional type, or detailed oriented type to futuristic/visionary type.

27. An apparatus for improving transactions in a communication system, comprising:

means for determining a personality profile of at least two agents;

means for determining a personality profile of a caller;

means for determining a personality profile for at least two machine based virtual agents; and means for connecting the caller to one of the at least two agents and the at least two virtual agents based on the personality profiles of the caller, the virtual agents, and the agents.

28. The apparatus according to claim 27, wherein the caller is an inbound caller to the communication system, the personality profile of the caller being determined by at least one of previous transaction success between the caller and a predetermined agent, caller answers to menu choices, past purchase history, past calling history, caller survey responses.

29. The apparatus according to claim 27, wherein a respective personality profile of the at least two agents is determined from predetermined testing of the at least two agents.

30. The apparatus according to claim 27, wherein a personality profile of a respective agent of the at least two agents and of the at least two virtual agents is classified as at least one of the following personality profile types: analytical type, detailed oriented type, relationship/emotional type, and futuristic/visionary type.

31. The apparatus according to claim 30, wherein connection of the caller to an agent is determined by matching the personality profile type of the caller to the personality profile type of the agent.

32. The apparatus according to claim 31, wherein the matching of the caller personality profile type to the agent personality profile type has a priority hierarchy as follows:

first priority, match analytical type to analytical type, detailed oriented type to detailed oriented type, relationship/emotional type to relationship/emotional type, or futuristic/visionary type to futuristic/visionary type;

second priority, match analytical type to detailed oriented type, or relationship/emotional type to futuristic/visionary type;

third priority, match analytical type to futuristic/visionary type, or detailed oriented type to relationship/emotional type;

fourth priority, match analytical type to relationship/emotional type, or detailed oriented type to futuristic/visionary type.

33. An apparatus that improves transactions in an automatic call distribution system, comprising:

means for determining a personality profile of each agent of a plurality of agents, a respective personality profile being at least one of the following plurality of personality profile types: analytical type, detailed oriented type, relationship/emotional type, and futuristic/visionary type;

means for storing the determined personality profile types for respective agents of the plurality of agents as personality profile records in a database;

means for determining a personality profile of a caller, the personality profile of the caller being one of the plurality of personality profile types;

means for providing a priority hierarchy for matches of personality profile type of the caller to personality profile types of the agents;

means for comparing the personality profile type of the caller to the personality profile types of the agents in the database according to the priority hierarchy;

means for selecting an agent from the plurality of agents based on the comparison of personality profile types; and means for establishing communication between the caller and the selected agent.

34. The apparatus according to claim 33, wherein the caller is an inbound caller to the automatic call distribution system, the personality profile of the caller being determined by at least one of previous transaction success between the caller and a predetermined agent, caller answers to menu choices, past purchase history, past calling history, caller survey responses.

35. The apparatus according to claim 33, wherein a respective personality profile of a respective agent of the plurality of agents is determined from predetermined testing of the respective agent.

36. The apparatus according to claim 33, wherein the apparatus comprises at least two machine based virtual agents is classified as at least one of the following personality profile types: analytical type, detailed oriented type, relationship/emotional type, and futuristic/visionary type.

37. The apparatus according to claim 36, wherein connection of the caller to a virtual agent is determined by matching the personality profile type of the caller to the personality profile type of the virtual agent.

38. The apparatus according to claim 37, wherein the matching of the caller personality profile type to the agent personality profile type has a priority hierarchy as follows:
first priority, match analytical type to analytical type, detailed oriented type to detailed oriented type, relationship/emotional type to relationship/emotional type, or futuristic/visionary type to futuristic/visionary type;
second priority, match analytical type to detailed oriented type, or relationship/emotional type to futuristic/visionary type;
third priority, match analytical type to futuristic/visionary type, or detailed oriented type to relationship/emotional type;
fourth priority, match analytical type to relationship/emotional type, or detailed oriented type to futuristic/visionary type.

39. An apparatus that improves transactions in an automatic call distribution system, comprising:
a plurality of agents and a plurality of machine based virtual agents;
a predetermined plurality of personality profile types based upon social traits;
a first profile determination module that determines a personality profile of each agent of the plurality of agents and each virtual agent of the plurality of virtual agents, a respective personality profile being one of the plurality of personality profile types;
a database in which is stored the determined personality profile types for respective agents of the plurality of agents as personality profile records in the database, the database operatively connected to the profile determination module;

a second profile determination module that determines a personality profile of a caller, the personality profile of the caller being one of the plurality of personality profile types;

a propriety module operatively connected to the database and to the second profile determination module, the propriety module outputting a priority hierarchy for matches of personality profile type of the caller to personality profile types of the agents and virtual agents;

a comparator having inputs for the personality profile type of the caller and the personality profile types of the agents and virtual agents in the database according to the priority hierarchy, the comparator outputting the comparisons of the personality profile type of the caller and the personality profile types of the agents and the virtual agents;

a selector that receives the output of the comparator and in response thereto selects an agent or virtual agent from the plurality of agents and virtual agents based on the comparison of personality profile types; and a communication module that establishes communication between the caller and the selected agent or virtual agent.

40. The apparatus according to claim 39, wherein the caller is an inbound caller to the automatic call distribution system, the personality profile of the caller being determined by at least one of previous transaction success between the caller and a predetermined agent, caller answers to menu choices, past purchase history, past calling history, caller survey responses.

41. The apparatus according to claim 39, wherein a respective personality profile of a respective agent of the plurality of agents is determined from predetermined testing of the agents.

42. The apparatus according to claim 39, wherein a personality profile of a respective agent of the plurality of agents and of the plurality of virtual agents is classified as at least one of the following personality profile types: analytical type, detailed oriented type, relationship/emotional type, and futuristic/visionary type.

43. The apparatus according to claim 42, wherein connection of the caller to an agent is determined by matching the personality profile type of the caller to the personality profile type of the agent.

44. The apparatus according to claim 43, wherein the matching of the caller personality profile type to the agent personality profile type has a priority hierarchy as follows:
first priority, match analytical type to analytical type, detailed oriented type to detailed oriented type, relationship/emotional type to relationship/emotional type, or futuristic/visionary type to futuristic/visionary type;
second priority, match analytical type to detailed oriented type, or relationship/emotional type to futuristic/visionary type;
third priority, match analytical type to futuristic/visionary type, or detailed oriented type to relationship/emotional type;
fourth priority, match analytical type to relationship/emotional type, or detailed oriented type to futuristic/visionary type.

* * * * *